(12) United States Patent
Bish et al.

(10) Patent No.: US 6,638,999 B2
(45) Date of Patent: Oct. 28, 2003

(54) CURABLE PERFLUOROELASTOMER COMPOSITION

(75) Inventors: Christopher John Bish, Kennett Square, PA (US); Peter Arnold Morken, Wilmington, DE (US); Walter Werner Schmiegel, Wilmington, DE (US)

(73) Assignee: DuPont Dow Elastomers LLC., Wilmington, DE (US)

( * ) Notice: Subject to any disclaimer, the term of this patent is extended or adjusted under 35 U.S.C. 154(b) by 355 days.

(21) Appl. No.: 09/777,372

(22) Filed: Feb. 6, 2001

(65) Prior Publication Data

US 2002/0026014 A1 Feb. 28, 2002

Related U.S. Application Data

(60) Provisional application No. 60/181,035, filed on Feb. 8, 2000.

(51) Int. Cl.$^7$ ................................................. C08K 5/17
(52) U.S. Cl. ....................... 524/195; 524/236; 524/238; 524/241; 524/251
(58) Field of Search ................................. 524/195, 236, 524/238, 241, 251

(56) References Cited

U.S. PATENT DOCUMENTS

| | | |
|---|---|---|
| 3,071,565 A | 1/1963 | Davis et al. |
| 3,686,143 A | 8/1972 | Bowman |
| 3,686,154 A | 8/1972 | Khan |
| 4,199,626 A | 4/1980 | Stryjewski et al. |
| 4,375,505 A | 3/1983 | Newkirk |
| 4,525,539 A | 6/1985 | Feiring |
| 5,637,648 A | 6/1997 | Saito et al. |
| 5,668,221 A | 9/1997 | Saito et al. |
| 5,677,389 A | 10/1997 | Logothetis et al. |
| H1736 H | 6/1998 | Legare et al. |

FOREIGN PATENT DOCUMENTS

| | | |
|---|---|---|
| EP | 735095 A1 | 10/1996 |
| WO | WO 0009603 | 2/2000 |

OTHER PUBLICATIONS

M. P. Grinblat, I.V. Ikonitskii, N. Ye. Gordiyenko, M. M. Fomicheva; Infrared Investigation of the Vulcanization of Perfluoroalkylenetriazine Polymers, Polymer Science U.S.S.R., 1980, pp. 1434–1441, vol. 21, Pergamon Press Ltd., Poland.

*Primary Examiner*—Peter D. Mulcahy

(57) ABSTRACT

Perfluoroelastomer compositions comprising perfluoroelastomers having copolymerized units of tetrafluoroethylene, a perfluoro(vinyl ether), and a nitrile-containing cure site monomer are cured with certain nitrogen-containing nucleophilic compounds. The nucleophilic compounds also act as dual curatives in perfluoroelastomer compositions which incorporate other curing agents.

12 Claims, No Drawings

CURABLE PERFLUOROELASTOMER COMPOSITION

CROSS REFERENCE TO RELATED APPLICATION

This application claims the benefit of U.S. Provisional Application 60/181,035, filed Feb. 8, 2000.

FIELD OF THE INVENTION

This invention relates to perfluoroelastomer compositions having enhanced cure rate.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment that operates at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene and perfluoro(alkyl vinyl) ethers. In order to develop elastomeric properties fully, perfluoroelastomers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Curing systems that incorporate tetraphenyltin have been successfully used to vulcanize nitrile-containing perfluoroelastomers. However, in certain circumstances the cure rate of such compositions is too slow for economically effective commercial production of perfluoroelastomer articles. Logothetis and Schmiegel, in U.S. Pat. No. 5,677,389, disclose ammonium salts as accelerators in combination with a variety of curing systems that crosslink perfluoroelastomers. Curable compositions containing the ammonium salts exhibit enhanced cure rate, but in some instances certain ammonium salt accelerators are not effective because of insolubility in the polymer.

Saito, et al., in U.S. Pat. No. 5,565,512, disclose the use of ammonium salts of organic or inorganic acids as curing agents for perfluoroelastomers. Such compositions exhibit the same solubility problems that occur with compounds in which ammonium salts are used as accelerators.

MacLachlan et al., in published International Patent application WO 00/09603, disclose the use of compounds which thermally decompose to produce ammonia as curatives for nitrile-containing perfluoroelastomers. Some of these ammonia-generating compounds may also exhibit solubility problems when mixed with the perfluoroelastomer. It would be beneficial to have a means for curing or for improving the cure rate of perfluoroelastomers that does not depend on the use of ammonium salts or compounds which produce ammonia upon decomposition. It would also be beneficial to extend the variety of curatives that are useful in vulcanizing nitrile-containing perfluoroelastomers and to extend the processing conditions under which such curatives may be employed.

SUMMARY OF THE INVENTION

The present invention is directed to curable perfluoroelastomer compositions which comprise a perfluoroelastomer and certain nitrogen-containing nucleophilic compounds. The nucleophilic compounds act as either the sole curatives or as co-curatives with another curative. More specifically, the present invention is directed to a curable composition comprising:

A. a perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers; and B. a nitrogen-containing nucleophilic compound selected from the group consisting of i) heterocyclic secondary amines; ii) guanidines; iii) compounds which decompose in-situ at a temperature between 40° C. and 330° C. to produce a guanidine; iv) compounds which decompose in-situ at a temperature between 40° C. and 330° C. to produce a primary or secondary amine; v) nucleophilic compounds of the formula $R_1-NH-R_2$, wherein $R_1$ is H—, a $C_1-C_{10}$ aliphatic hydrocarbon group, or an aryl group having hydrogen atoms in the alpha positions, $R_2$ is a $C_1-C_{10}$ aliphatic hydrocarbon group, an aryl group having hydrogen atoms in the alpha positions, $-CONHR_3$, $-NHCO_2R_3$, or $-OH.HOOC-C_7F_{15}$; and $R_3$ is a $C_1-C_{10}$ aliphatic hydrocarbon group; and vi) substituted amidines of the formula $HN=CR_4NR_5R_6$, wherein $R_4$, $R_5$, $R_6$ are independently H—, alkyl or aryl groups and wherein at least one of $R_4$, $R_5$ and $R_6$ is not H—.

DETAILED DESCRIPTION OF THE INVENTION

The compositions of the present invention are based on elastomeric perfluoropolymers (hereinafter "perfluoroelastomers"), that is substantially fully fluorinated fluoropolymers which, when cured, exhibit an elastomeric character. The perfluoroelastomers contain nitrile groups that render the polymers crosslinkable.

Perfluoroelastomers are polymeric compositions having copolymerized units of at least two principal perfluorinated monomers. Generally, one of the principal comonomers is a perfluoroolefin, while the other is a perfluorovinyl ether that does not contain a nitrile group. Representative perfluorinated olefins include tetrafluoroethylene and hexafluoropropylene. Suitable perfluorinated vinyl ethers are those of the formula

$$CF_2=CFO(R_fO)_n(R_{f'}O)_mR_{f''} \qquad (I)$$

where $R_f$ and $R_{f'}$ are different linear or branched perfluoroalkylene groups of 2–6 carbon atoms, m and n are independently 0–10, and $R_{f''}$ is a perfluoroalkyl group of 1–6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula $$CF_2=CFO[(CF_2)_mCF_2CFZO]_nR_f \quad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \quad (IV)$$

where m and n=1–10, p=0–3, and x=1–5.

Preferred members of this class include compounds where n=0–1, m=0–1, and x=1.

Examples of useful perfluoro(alkoxy vinyl) ethers include $$CF_2=CFOCF_2CF(CF_3)O(CF_2O)_mC_nF_{2n+1} \quad (V)$$

where n=1–5, m=1–3, and where, preferably, n=1.

Mixtures of perfluoro(alkyl vinyl) ethers and perfluoro (alkoxy vinyl) ethers may also be used.

Preferred perfluoroelastomers are composed of tetrafluoroethylene and at least one perfluoro(alkyl vinyl) ether as principal monomer units. In such copolymers, the copolymerized perfluorinated ether units constitute from about 15–60 mole percent of total monomer units in the polymer.

The perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

$$CF_2=CF-O[CF_2-CFCF_3-O]_n-CF_2-CFCF_3-CN \quad (VII)$$

where n=0–4, preferably 0–2;

$$CF_2=CF-[OCF_2CFCF_3]_x-O-(CF_2)_n-CN \quad (VIII)$$

where x=1–2, and n=1–4; and $$CF_2=CF-O-(CF_2)_n-O-CF(CF_3)CN \quad (IX)$$

where n=2–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The perfluoroelastomers suitable for use in the present invention may contain any of a variety of endgroups as a result of the use of varying initiators or chain transfer agents during polymerization. For example, the polymers may contain sulfonate, sulfonic acid, carboxylate, carboxylic acid, carboxamide, difluoromethyl groups, trifluorovinyl groups, or perfluorinated alkyl groups.

A first embodiment of this invention is a curable composition comprising: A) a perfluoroelastomer as defined above and B) a nitrogen-containing nucleophilic compound selected from the group consisting of i) heterocyclic secondary amines; ii) guanidines; iii) compounds which decompose in-situ at a temperature between 40° C. and 330° C. to produce a guanidine; iv) compounds which decompose in-situ at a temperature between 40° C. and 330° C. to produce a primary or secondary amine; v) nucleophilic compounds of the formula $R_1$—NH—$R_2$, wherein $R_1$ is H—, a $C_1$–$C_{10}$ aliphatic hydrocarbon group, or an aryl group having hydrogen atoms in the alpha positions, $R_2$ is a $C_1$–$C_{10}$ aliphatic hydrocarbon group, an aryl group having hydrogen atoms in the alpha positions, —CONH$R_3$, —NHCO$_2R_3$, or —OH.HOOC—$C_7F_{15}$, and $R_3$ is a $C_1$–$C_{10}$ aliphatic hydrocarbon group; and vi) substituted amidines of the formula HN=CR$_4$NR$_5$R$_6$, wherein $R_4$, $R_5$, $R_6$ are independently H—, alkyl or aryl groups and wherein at least one of $R_4$, $R_5$ and $R_6$ is not H—.

As used herein, "heterocyclic secondary amines" refers to aromatic or aliphatic cyclic compounds which have at least one secondary amine nitrogen contained within the ring. Such compounds include, for example, pyrrole, imidazole, pyrazole, 3-pyrroline, and pyrrolidine.

Guanidines included in this invention are compounds derived from guanidine, i.e. compounds which contain the radical, —NHCNHNH—, such as, but not limited to, diphenylguanidine, diphenylguanidine acetate, aminobutylguanidine, biguanidine, isopentylguanidine, di-o-tolylguanidine, o-tolylbiguanide, and triphenylguanidine.

Compounds which decompose in-situ at a temperature between 40° C. and 330° C. to produce either a primary or secondary amine include, but are not limited to, di- or poly-substituted ureas (e.g. 1,3-dimethyl urea); N-alkyl or -dialkyl carbamates (e.g. N-(tert-butyloxycarbonyl) propylamine); di- or poly-substituted thioureas (e.g. 1,3-dimethyl-thiourea); aldehyde-amine condensation products (e.g. 1,3,5-trimethylhexahydro-1,3,5-triazine); N,N'-dialkyl phthalamide derivatives (e.g. N,N'-dimethylphthalamide); and amino acids.

Illustrative examples of nucleophilic compounds of formula $R_1$—NH—$R_2$ include, but are not limited to, aniline, t-butylcarbazate, $C_1$–$C_{10}$ aliphatic primary amines (such as methylamine), and the perfluorooctanoate salt of hydroxylamine.

Illustrative examples of substituted amidines of the formula HN=CR$_4$NR$_5$R$_6$ include benzamidine and N-phenylbenzamidine. Perfluorinated amidines are not included within the definition of substituted amidines as used herein.

It is theorized that most of these nucleophilic compounds act as curing adjuvants by catalyzing the trimerization of polymer chain bound nitrile groups to form s-triazine rings, thus crosslinking the perfluoroelastomer. However, some of the curing adjuvants, such as the guanidines, appear to form only a minor amount of s-triazine rings during crosslinking. It is believed that the major vulcanization reaction is that of guanidine reacting with only two polymer bound nitrile groups to produce a non-symmetrical, substituted triazine, thus crosslinking the perfluoroelastomer.

Only certain nitrogen-containing nucleophilic compounds act as curing adjuvants in the compositions of this invention. For example, compounds containing only tertiary amine groups, and aliphatic primary amines having more than about ten carbon atoms do not function as curing adjuvants in this invention. Also, it is believed that nucleophilic compounds of the formula $R_7$—$NH_2$ (wherein $R_7$ is an aryl group having substituted in one or more alpha positions an —$NH_2$, —OH, or —SH functional group) form benzimidazole, benzoxazole, and benzothiazole cure site microstructures, respectively, (rather than a triazine) and are thus not suitable as nucleophilic curing adjuvants for use in the compositions of this invention.

In order to be useful as either the major, or as the only curative for these perfluoroelastomers, the level of nitrogen-containing nucleophilic compound should be about 0.1 to 7 parts nucleophilic compound per 100 parts perfluoroelastomer, preferably about 1 to 5 parts nucleophilic compound per 100 parts perfluoroelastomer. As used herein, "parts" refers to parts by weight, unless otherwise indicated.

In a second embodiment of the invention, the curable perfluoroelastomer composition of the first embodiment further comprises C) a curative, different from curing adjuvant component B). Thus, the second embodiment of this invention may be thought of as a "dual cure" curable perfluoroelastomer composition wherein different types of crosslinks can be formed in the perfluoroelastomer, depending upon the nature of the curative C). Dual cured perfluoroelastomers may benefit from the advantages of the two different types of curatives, e.g. chemical resistance from one type of curative and heat resistance from the other curative.

The same nucleophilic compounds that are used in the first embodiment of this invention can be used here in the second embodiment. The level at which the nitrogen-containing nucleophilic compound is present in the second embodiment of this invention is generally from 0.01 to 5 parts nucleophilic compound per 100 parts perfluoroelastomer. Preferably 0.05–3.0 parts nucleophilic compound per 100 parts perfluoroelastomer will be used. Curable perfluoroelastomer compositions containing above 5 parts nucleophilic compound per 100 parts perfluoroelastomer are generally scorchy and result in compositions of high Mooney viscosity.

An appropriate level of nucleophilic compound can be selected by considering cure properties, for example the time to develop maximum moving die rheometer (MDR) torque and minimum Mooney scorch of the curable compositions. The optimum level will depend on the particular combination of perfluoroelastomer and curative C).

The curative C) which is used in this embodiment is a compound which is capable of crosslinking the perfluoroelastomer, for example an organotin compound or certain amino group-containing benzene compounds. Suitable organotin compounds include allyl-, propargyl-, triphenyl- and allenyl tin curatives. Tetraalkyltin compounds or tetraaryltin compounds are the preferred organotin curing agents for use in conjunction with nitrile-substituted cure sites. Tetraphenyltin is particularly preferred. The amount of the curing agent C) employed will necessarily depend on the degree of crosslinking desired in the final product as well as the type and concentration of reactive moieties in the perfluoroelastomer. In general, about 0.5–10 parts per hundred parts rubber, i.e. phr, of curing agent C) can be used, and 1–4 phr is satisfactory for most purposes. The crosslinks are thermally stable, even at temperatures of 275° C. and above.

Another preferred curative C), useful for perfluoroelastomers containing nitrile-containing curesites utilizes bis(aminophenols) and bis(aminothiophenols) of the formulas

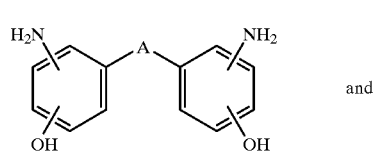
(XI)

and

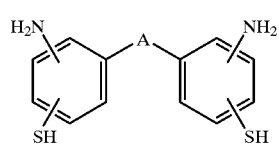
(XII)

and tetraamines of the formula

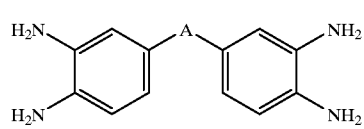
(XII)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XI and XII above, are interchangeably in the meta and para positions with respect to the group A. Preferably, the second curing agent is a compound selected from the group consisting of 2,2-bis[3-amino-4-hydroxyphenyl]hexafluoropropane; 4,4'-sulfonylbis(2-aminophenol); 3,3'-diaminobenzidine; and 3,3', 4,4'-tetraaminobenzophenone. The first of these preferred curing agents will be referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. Of the members of the preferred class, a particularly preferred compound is 3,3'-diaminobenzidine. Carboxylated perfluoroelastomers cured in the presence of 3,3'-diaminobenzidine show unusually good solvent resistance, as evidenced by greater resistance to volume swell in certain solvents compared to perfluoroelastomers cured in the presence of other agents. The level of curing agent should be chosen to optimize the desired properties of the vulcanizate. In general, a slight excess of the second curing agent over the amount required to react with all the cure sites present in the polymer is used. Typically, 0.5–5.0 parts by weight of curative C) per 100 parts of polymer is required. The preferred range is 1.0–2.5 parts.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D 1765. A particular class of carbon blacks useful in the compositions of the present invention are those described in WO 95/22575. These carbon blacks have average particle sizes of at least about 100 nm to about 500 nm as determined by ASTM D 3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, or in the alternative, fluoropolymer fillers may be present in the composition. Generally from 1 to 50 parts phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the compositions of the invention include, but are not limited to, those based on the group of polymers known as tetrafluoroethylene (TFE) polymers. This group includes homopolymers of TFE (PTFE) and copolymers of TFE with small concentrations of at least one copolymerizable modifying monomer such that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include those derived from suspension polymerization as well as those derived from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5-60\times10^3$ Pa.s, but viscosities outside this range are also known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

A further preferred filler is anhydrous silica, generally an acidic silica or fumed silica. Such silicas are available from Degussa Aktiengesellschaft (Frankfurt, Germany) under the Aerosil® trademark. A particularly useful type is Aerosil® 200 silica. Other suitable silicas include Reolosil® silicas, available from Tokuyama KK (Tokyo, Japan), for example Reolosil® QS13, Reolosil® QS102, and Reolosil® QS30. Amounts of 1–25 phr are effective to reduce HF generation. However, it is preferable to use no more than 1–7 phr because at higher concentrations of silica the compression set resistance of cured perfluoroelastomer seals containing the high concentrations deteriorates (i.e. increases), leading to high compression set and poor sealing characteristics. If less than 1 phr anhydrous silica is used, the degree of corrosion becomes unacceptable for many applications.

The curable compositions of the invention may be prepared by mixing the perfluoroelastomer, nitrogen-containing nucleophilic compound, optional curing agent and other components using standard rubber compounding procedures. For example, the components may be mixed on a two roll rubber mill, in an internal mixer, for example, a Banbury internal mixer, or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 300° C. for several hours.

The curable compositions of the present invention are useful in production of gaskets, tubing, and seals. Such articles are generally produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

Test Methods

Cure Characteristics

Cure characteristics were measured using a Monsanto MDR 2000 instrument under the following conditions:

Moving die frequency: 1.66 Hz
Oscillation amplitude: ±0.5 degrees
Temperature: 199° C., unless otherwise noted
Sample size: Disks having diameter of 1.5 inches (38 mm)
Duration of test: 30 minutes for examples of the invention, 20 minutes for comparative examples The following cure parameters were recorded:

$M_H$: maximum torque level, in units of N.m $M_L$: minimum torque level, in units of N.m Test specimens were prepared from elastomer compounded with appropriate additives, as described in the formulations listed in the Examples below. Compounding was carried out on a rubber mill. The milled composition was formed into a sheet and a 10 g sample was die cut into a disk to form the test specimen.

Cure characteristics were determined by placing a test specimen in the sealed test cavity of the instrument which was maintained under a positive pressure and elevated temperature. The force at maximum amplitude (torque) required to rotate the disk is proportional to the stiffness (shear modulus) of the rubber. This torque was recorded as a function of time. Because stiffness of a rubber specimen increases during curing, the test provides a measure of curability. A test is completed when the recorded torque either reaches equilibrium or maximum value, or when a predetermined time has elapsed. The time required to obtain a curve is a function of the test temperature and the characteristics of the rubber compound.

Examples 1–4

A perfluoroelastomer containing 48.8 wt. % units of TFE, 49.0 wt. % units of perfluoro(methyl vinyl) ether (PMVE) and 2.2 wt. % units of 8-CNVE was prepared substantially according to the general process described in U.S. Pat. No. 5,789,489 and isolated in the presence of D65 water-based silicone defoamer, available from Dow Corning Corporation, Midland, Mich.

A sample of the perfluoroelastomer was compounded on a two-roll rubber mill with a nitrogen-containing nucleophilic compound of this invention in the proportions shown in Table I. The compounded compositions are labeled Example 1 (aniline), Example 2 (diphenylguanidine), Example 3 (t-butylcarbazate) and Example 4 (imidazole) in Table I. Cure characteristics of the compounded compositions are also shown in Table I.

Comparative Examples comprising nitrogen-containing nucleophilic compounds which are not part of this invention were made and tested in the same manner as were Examples 1–4, except that the perfluoroelastomer composition was 53 wt. % TFE, 44.6 w. % PMVE and 2.3 wt. % 8-CNVE. The nucleophilic in Comparative Example A, octadecylamine (Armeen 18 D), and in Comparative Example B, 1,8-bis (dimethylamino)naphthalene (Proton-Sponge®), did not act as curatives as evidenced by the insignificant rise in torque ($M_H$-$M_L$) during curing shown in Table I.

TABLE I

| Formulation (phr)[1] | Example 1 | Example 2 | Example 3 | Example 4 | Comp. Ex. A | Comp. Ex. B |
|---|---|---|---|---|---|---|
| Perfluoro-elastomer | 100 | 100 | 100 | 100 | 100 | 100 |
| Carbon Black MT | 0 | 0 | 0 | 0 | 15 | 15 |
| Aniline | 1 | 0 | 0 | 0 | 0 | 0 |
| Diphenyl-guanidine | 0 | 1 | 0 | 0 | 0 | 0 |
| t-butyl-carbazate | 0 | 0 | 1 | 0 | 0 | 0 |
| Imidazole | 0 | 0 | 0 | 1 | 0 | 0 |
| Armeen IBD | 0 | 0 | 0 | 0 | 1 | 0 |
| Proton Sponge | 0 | 0 | 0 | 0 | 0 | 1 |
| Cure Characteristics | | | | | | |
| $M_L$ (N.m) | 0.277[2] | 0.308 | 0.156 | ~0.26 | 0.244 | 0.164 |
| $M_H$ (N.m) | 0.521 | 0.826 | 1.04 | ~0.5 | 0.268 | 0.205 |

[1]Parts per hundred parts perfluoroelastomer;
[2]cured at 177° C.

What is claimed is:

1. A curable composition comprising:
   A. a perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers; and
   B. a nitrogen-containing nucleophilic compound selected from the group consisting of i) heterocyclic secondary amines; ii) guanidines; iii) compounds which decompose in-situ at a temperature between 40° C. and 330° C. to produce a guanidine; iv) compounds which decompose in-situ at a temperature between 40° C. and 330° C. to produce a primary or secondary amine; v) nucleophilic compounds of the formula $R_1$—NH—$R_2$, wherein $R_1$ is H—, a $C_1$–$C_{10}$ aliphatic hydrocarbon group, or an aryl group having hydrogen atoms in the alpha positions, $R_2$ is a $C_1$–$C_{10}$ aliphatic hydrocarbon group, an aryl group having hydrogen atoms in the alpha positions, —CONH$R_3$, —NHCO$_2R_3$, or —OH.HOOC—$C_7F_{15}$, and $R_3$ is a $C_1$–$C_{10}$ aliphatic hydrocarbon group; and vi) substituted amidines of the formula HN=C$R_4$N$R_5R_6$, wherein $R_4$, $R_5$, $R_6$ are independently H—, alkyl or aryl groups and wherein at least one of $R_4$, $R_5$ and $R_6$ is not H—.

2. A composition of claim 1 wherein the nucleophilic compound is aniline.

3. A composition of claim 1 wherein the nucleophilic compound is diphenylguanidine.

4. A composition of claim 1 wherein the nucleophilic compound is a substituted amidine selected from the group consisting of benzamidine and N-phenylbenzamidine.

5. A composition of claim 1 wherein the nucleophilic compound is t-butylcarbazate.

6. A composition of claim 1 wherein the nucleophilic compound is imidazole.

7. A composition of claim 1 wherein the nucleophilic compound is methylamine.

8. A curable composition comprising:
   A. a perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers;
   B. a nitrogen-containing nucleophilic compound selected from the group consisting of i) heterocyclic secondary amines; ii) guanidines; iii) compounds which decompose in-situ at a temperature between 40° C. and 330°

C. to produce a guanidine; iv) compounds which decompose in-situ at a temperature between 40° C. and 330° C. to produce a primary or secondary amine; v) nucleophilic compounds of the formula $R_1$—NH—$R_2$, wherein $R_1$ is H—, a $C_1$–$C_{10}$ aliphatic hydrocarbon group, or an aryl group having hydrogen atoms in the alpha positions, $R_2$ is a $C_1$–$C_{10}$ aliphatic hydrocarbon group, an aryl group having hydrogen atoms in the alpha positions, —CONHR$_3$, —NHCO$_2$R$_3$, or —OH.HOOC—$C_7F_{15}$, and $R_3$ is a $C_1$–$C_{10}$ aliphatic hydrocarbon group; and vi) substituted amidines of the formula HN=CR$_4$NR$_5$R$_6$, wherein $R_4$, $R_5$, $R_6$ are independently H—, alkyl or aryl groups and wherein at least one of $R_4$, $R_5$ and $R_6$ is not H—; and C) a curative, other than the nitrogen-containing nucleophilic compound B).

9. A composition of claim 8 wherein the curative C) is selected from the group consisting of organotin compounds, bis(aminophenol) compounds, bis(aminothiophenol) compounds and tetraamines.

10. A composition of claim 9 wherein the curative C) is tetraphenyltin.

11. A composition of claim 9 wherein the curative C) is diaminobisphenol AF.

12. A composition of claim 9 wherein the curative C) is 3,3'-diaminobenzidine.

* * * * *